Patented Mar. 20, 1928.

1,663,101

UNITED STATES PATENT OFFICE.

CHARLES M. A. STINE AND COLE COOLIDGE, OF WILMINGTON, DELAWARE, ASSIGNORS TO E. I. DU PONT DE NEMOURS & COMPANY, OF WILMINGTON, DELAWARE, A CORPORATION OF DELAWARE.

COATING COMPOSITION AND PROCESS OF MAKING THE SAME.

No Drawing.  Application filed September 5, 1924.  Serial No. 736,018.

This invention relates to coating compositions or paint and varnish liquids in which rubber is incorporated with an oil, preferably drying or semi-drying; and has for its object certain improvements in the working properties of such coating compositions.

In co-pending application, Serial No. 681,648, filed December 19, 1923, methods have been disclosed for the preparation of coating compositions or paint and varnish liquids by combining solutions of unvulcanized rubber or caoutchouc with drying oils; therein is also disclosed the fact that films produced from such liquids, either with or without the incorporation of pigments, may be hardened by heating to relatively low temperatures for suitable periods of time; and further that the drying or hardening of such films may be promoted if desired by the incorporation of suitable metallic driers, curing agents, or vulcanizing agents and accelerators.

We have discovered, however, that when metallic driers are used to bring about rapid hardening of the films obtained therefrom, the preparation of paint and varnish liquids containing unvulcanized rubber and a drying oil which are satisfactory from a practical standpoint, depends upon a proper understanding of certain relationships which we have found to exist between the amount of metallic drier present and changes which occur in the body or viscosity of such paint and varnish liquids when the latter are allowed to stand more or less exposed to atmospheric oxygen. If these changes in body or viscosity are not properly controlled, the liquids may in a relatively short time become unsuitable for practical use.

We have observed for example that a paint or varnish liquid containing 100 lbs. of crude rubber, 50 gals. of drying oil carrying an amount of cobalt linoleate equivalent to 0.03% Co (on the basis of weight of oil) and thinned to a consistency satisfactory for paint purposes, will on standing for only two days' time with only moderate exposure to atmospheric oxygen, decrease in viscosity to such an extent as to render the application of the liquid as a varnish, or of paint or enamel made by the incorporation of pigments therewith, impracticable.

If, in the above combination, the amount of drier be reduced to the equivalent of 0.01% Co or less (on the basis of oil weight) the rate of change in body or viscosity is reduced to a very marked extent, so much so that after 21 days' standing with moderate exposure to atmospheric oxygen, the material is still satisfactory for paint and varnish purposes. If the amount of drier be decreased to the equivalent of 0.003 to 0.005% Co (basis of oil weight), the rate of change in body or viscosity is still further reduced—in fact the material then behaves in substantially the same manner (with respect to viscosity changes) as material containing no metallic driers.

The above observations may be illustrated more specifically by the data given in Table I in which the observed viscosities of several different varnish liquids of the above described type, containing various amounts of driers, are recorded after various periods of standing:

Table I.

| Sample No. | Amount of drier as % Co | Initial viscosity | Viscosity after standing— | | |
|---|---|---|---|---|---|
| | | | 2 days | 7 days | 21 days |
| 1 | None. | 2.50 | 2.25 | 2.25 | 2.20 |
| 2 | 0.003 | 2.50 | 2.30 | 2.30 | 2.25 |
| 3 | 0.005 | 2.45 | 2.30 | 2.30 | 2.05 |
| 4 | 0.008 | 2.30 | 2.25 | 2.25 | 1.95 |
| 5 | 0.01 | 2.45 | 2.25 | 2.0 | 1.60 |
| 6 | 0.03 | 2.25 | 1.0 | 0.5 | <0.5 |
| 7 | 0.05 | 2.50 | 0.85 | <0.5 | <0.5 |

All of the liquids referred to in the above tabulation contained the proportion of 50 gals. of drying oil per 100 lbs. of rubber and were thinned to the "initial viscosity" with volatile solvent. The drier used was cobalt linoleate, the amount being expressed as % Co on the basis of weight of oil. The determinations of viscosities were made by the air-bubble test described by Messrs. H. A. Gardner and P. C. Holdt in Circular No. 178 of the Paint Manufacturers Association, using a set of standard tubes obtained from that laboratory. The figures given in the above tabulation represent the approximate absolute viscosities in poises at 25° C. Other well-known methods could, of course, be used for the determinations of viscosity.

The viscosity tests were made on samples of liquid stored at room temperature in 1 pint friction top paint cans of approximately 8 cm. diameter × 10 cm. depth internal dimensions, filled to about 75% of their capacity, and kept closed except for a period of about 10 minutes each day when they were opened, thoroughly stirred with a spatula and a sample tested for viscosity.

The above data are approximate only and are intended merely to illustrate the marked effect which increasing drier content has on the viscosity changes which we have observed to occur when coating compositions such as described above are allowed to stand more or less in contact with atmospheric oxygen.

From these data it is evident that a drier content equivalent to about 0.003 to 0.005% Co on the basis of weight of oil is to be preferred for compositions containing the proportion of about 50 gals. of drying oil per 100 lbs. of rubber. The use of even these small amounts of drier results, however, in a very appreciable improvement in the hardness and durability of films obtained as compared with those obtained when no drier is used. The time required for hardening or drying the film is also materially decreased. In other words, the use of an amount of drier equivalent to about 0.003 to 0.005% Co on the basis of weight of oil imparts highly desirable properties to these paint and varnish liquids without bringing about to an appreciable extent the undesirable changes in body or viscosity which are encountered when larger amounts of drier are used. In some cases, however, as much as the equivalent of 0.01% Co may be employed to advantage, and we have also found it at times desirable to employ as little as the equivalent of 0.001% Co. In general, however, for paint and varnish liquids containing the proportion of say about 40 to 60 gals. of drying oil per 100 lbs. of rubber, we prefer to use from about 0.003 to 0.005% Co as cobalt linoleate on the basis of oil weight. Films prepared from such compositions are preferably dried by heating at moderate temperatures (say from about 65° to 175° C.) and under such conditions extremely hard, waterproof, durable coatings are obtained. The exact conditions required for drying depend upon the specific use to which the film is to be put, and in the case of paints or enamels upon the particular pigment or combination of pigments employed. For example, when zinc oxide is the principal pigment present, drying for about three hours at 120° C. gives highly satisfactory results, whereas when carbon black is the chief pigment present, a higher temperature of 160° C. is required, although the time may be reduced to about two hours. We, therefore, do not wish to limit ourselves to any particular conditions under which films obtained according to this invention may be dried.

We have also prepared paint and varnish liquids containing the proportions of 75 gals. and 100 gals. of drying oil per 100 lbs. of crude rubber (which, following customary varnish terminology, may be referred to as being 75 and 100 gals. oil length respectively). The behavior of these with respect to changes in body is analogous to that of the 50 gals. product, except that when say cobalt linoleate is present equivalent to 0.003% Co on the basis of weight of oil, the weight of metallic drier in proportion to the rubber content of the solution is increased in exact proportion to the increase in oil length. The 75 to 100 gals. liquids containing this amount of drier are therefore found to lose body more rapidly than is desirable for practical purposes. This is illustrated by the data in Table II.

Table II.

| Sample No. | Gals. oil * per 100 lb. rubber | Initial viscosity | Viscosity after standing— | | |
|---|---|---|---|---|---|
| | | | 2 days | 7 days | 26 days |
| 1 | 50 | 2.50 | 2.30 | 2.30 | 2.25 |
| 2 | 75 | 2.45 | 2.25 | 2.25 | 1.75 |
| 3 | 100 | 2.30 | 2.20 | 1.85 | 1.0 |

*Oil in each case contained cobalt linoleate equivalent to 0.003% Co on basis of weight of oil.

If the drier content of the longer oil liquids is decreased to such an extent that changes in body are no longer serious, the maximum degree of hardness is not obtained in the dried film. Hence, we have found it expedient to prepare such liquids without the addition of any drier (or only a very small amount of drier), and to add part or all of the desired amount of drier just prior to or shortly before the use of the liquid for coating purposes. In this manner the difficulties encountered due to changes in viscosity may be overcome, and a larger proportion of drier used than would otherwise be feasible. We have, for example, found it desirable with liquids of 75 and 100 gals. oil length to employ in this manner up to the equivalent of say about 0.05% to 0.1% Co on the basis of oil weight.

Similarly we have found that for rubber-oil compositions of substantially less than 50 gals. oil length, the drier content of the oil may be increased roughly in inverse proportion to the oil length, that is, for any given oil length there is a maximum drier content which may be employed without resulting in serious changes in viscosity when the liquid is allowed to stand more or less in contact wtih atmospheric oxygen. For oil lengths of about 50 gals. or less this maximum drier content is usually sufficient to allow the obtainment of suitably hard, durable films when the proper drying conditions (that is time and temperature) are employed. It is obvious from the foregoing disclosures, however, that, if desired, additional drier or driers may be added to such products shortly prior to their use for coating purposes and the material used for such purposes before the lapse of sufficient time in more or less contact with atmospheric oxygen for changes in viscosity to occur to an undesirable extent.

Although in the above discussion we have, for the sake of simplicity, confined our examples to the use of cobalt linoleate as a drier, we have found that other driers behave similarly, although the optimum percentage of different driers varies widely. For example, we have found that as far as the effect on changes in viscosity is concerned, an amount of lead drier containing 0.05% Pb and an amount of zinc drier containing 0.25% Zn are substantially equivalent in effect to an amount of cobalt drier containing 0.003% Co. What we have said, therefore, as applying specifically to cobalt driers also holds more or less generally for other driers, and in the practice of our invention we do not limit ourselves to the use of any particular drier.

We have mentioned the effect of moderate exposure to atmospheric oxygen on the changes in body or viscosity that have been described. We have further observed that if paint or vanish liquids as described herein, containing various amounts of metallic drier, are preserved out of contact with oxygen, substantially no change in body occurs; also that even when no metallic drier is present, liquids in contact with atmospheric oxygen lose body slowly.

These observations indicate another manner in which our invention may be carried out; an amount of drier in excess of that which may be employed without bringing about rapid changes in the body or viscosity (in contact with oxygen) may be incorporated with coating compositions containing crude rubber and drying oils. The composition may then be preserved out of contact with air or oxygen, say in a sealed container, which will prevent an appreciable change in the viscosity. The composition may then be opened and employed for coating purposes before the lapse of sufficient time in contact with atmospheric oxygen for changes in viscosity to occur to an undesirable extent. The length of time which may elapse will, of course, depend upon the amount and kind of drier employed.

The changes in viscosity which we have observed when compositions containing crude rubber, drying oil and metallic drier are exposed to atmospheric oxygen may be explained on the basis of observations disclosed above, as follows: It is well known that oxygen brings about, more or less slowly, a depolymerization of rubber in solution, the oxygen probably acting catalytically. Since metallic driers are essentially oxygen carriers, it is reasonable to suppose that they accelerate the action of the oxygen and that the depolymerization of the rubber results in the decreased viscosity of the composition. However, we do not wish to limit ourselves in any way by the above theory, although it appears a reasonable explanation of the observed phenomena.

To summarize our invention, therefore, we have found that in the preparation of compositions of rubber and drying oils and metallic driers, for use as paint or varnish liquids, satisfactory practical properties are obtained only by a proper understanding of the relationships which have been described above between the amount of drier present and changes occurring in the body or viscosity of these liquids, and control of the amount of drier used, in accordance therewith. It will be understood that the scope of the invention is not limited in application to the control of the viscosity of rubber-oil coating compositions when used as such in a manner similar to clear varnishes, but extends also to paints, enamels or color varnishes in which such rubber-oil compositions are used as a vehicle with suitable pigments or inert materials incorporated therein.

It is to be understood also that although the use of crude or unvulcanized Hevea rubber is preferred in the practice of our invention, we do not wish to limit ourselves to this raw material, as other types of rubber can also be used with advantage, including botanical types, as balata, gutta percha, etc., also partly or wholly vulcanized rubber, including reclaim, etc. In the interpretation of our claims the term "rubber" is meant to include crude or unvulcanized caoutchouc, under which head may be included all the botanical varieties such as Hevea, balata, gutta percha, etc., and, as well, includes vulcanized rubber of any botanical variety in the state of partial vulcanization to the state of complete vulcanization, also reclaim, etc.

The term "oil" is used to cover animal, vegetable or mineral oils including all types as drying, semi-dyring, or non-drying oils, and as well, especially-treated oils; for example, blown or ozonized oils.

When mixing the above ingredients, and particularly when mixing the rubber with the oil, we have found it to be important to avoid heating the rubber in the mixing operation, or afterwards, to temperatures much above 300° F. as has been customary in processes heretofore proposed. We have found that when heated to these righ temperatures depolymerization, or other deleterious change in the rubber, apparently occurs, with the result that films obtained with the rubber-oil combination are apt to remain sticky or tacky on drying, and are not at all durable or practicable as protective or decorative coatings. No such depolymerization occurs, however, if the mixing operation is performed at temperatures of, for example, below 200° F. We prefer in practice to mix the rubber solution, oil, etc., at normal room temperature, that is, between 65 and 85° F.

We claim:

1. The process which comprises mixing 10 parts of unvulcanized rubber dissolved in a rubber solvent with from about 30 to 50 parts of a drying oil, thinning with a volatile solvent to a suitable consistency for coating purposes and incorporating therein an amount of cobalt drier equivalent to from about 0.001% to 0.01% cobalt metal on the basis of weight of oil used.

2. The process which comprise incorporating suitable pigments or inert materials with a composition containing 10 parts of crude or unvulcanized rubber, from about 30 to 50 parts of a drying oil, a volatile thinner and an amount of cobalt drier equivalent to from about 0.001% to 0.01% Co on the basis of weight of oil.

3. The process which comprises mixing 10 parts of unvulcanized rubber dissolved in a rubber solvent with from about 30 to 50 parts of a drying oil, thinning with a volatile solvent to a suitable consistency for coating purposes and incorporating therein an amount of metallic drier having, upon exposure to the atmosphere, an effect on the viscosity of the rubber solution equal to that of an amount of cobalt drier equivalent to from about 0.001% to 0.01% cobalt metal on the basis of weight of oil employed.

4. The process which comprises preparing a solution of rubber in a volatile solvent, said solution having a suitable consistency for use as a coating composition, and incorporating therein a drying oil and an amount of metallic drier having, upon exposure to the atmosphere, an effect on the viscosity of the rubber solution equal to that of an amount of cobalt drier equivalent to from about 0.001% to 0.01% cobalt metal on the basis of weight of oil employed.

5. The process which comprises incorporating suitable pigments or inert materials with a composition containing 10 parts of crude or unvulcanized rubber, from about 30 to 50 parts of a drying oil, a volatile thinner and an amount of drier having, upon exposure to the atmosphere, an effect on the viscosity of the rubber solution equal to that of an amount of cobalt drier equivalent to from about 0.001% to 0.01% cobalt metal on the basis of weight of oil employed.

6. The process which comprises mixing 10 parts of unvulcanized rubber dissolved in a rubber solvent with from about 30 to 80 parts of a drying oil, thinning with a volatile solvent to a suitable consistency for coating purposes and incorporating therein an amount of cobalt drier equivalent to from about .001% to .01% cobalt metal on the basis of weight of oil used, whereby, with exposure to atmospheric oxygen ordinarily encountered in the art, the viscosity of the composition remains satisfactory for coating purposes over a period of time in excess of two days.

7. The process which comprises incorporating suitable pigments or inert materials with a composition containing 10 parts of crude or unvulcanized rubber, from about 30 to 80 parts of a drying oil, a volatile thinner and an amount of cobalt drier equivalent to from about .001% to .01% cobalt on the basis of weight of oil whereby, with exposure to atmospheric oxygen ordinarily encountered in the art, the viscosity of the composition remains satisfactory for coating purposes over a period of time in excess of two days.

8. The process as defined in claim 6, in which process the mixture comprising rubber and oil is maintained at a temperature below 200° F.

9. A coating composition comprising 10 parts of unvulcanized rubber, about 30 to 50 parts of a drying oil, a volatile solvent and an amount of metallic drier having, upon exposure to the atmosphere, an effect on the viscosity of the rubber solution equal to the effect of an amount of cobalt drier equivalent to from about 0.001% to 0.01% cobalt metal on the basis of weight of oil employed.

10. A coating composition comprising a solution of rubber in a rubber solvent, a drying oil and an amount of metallic drier having, upon exposure to the atmosphere, an effect on the viscosity of the rubber solution equal to that of an amount of cobalt drier equivalent to from about 0.001% to 0.01% cobalt metal on the basis of weight of oil employed.

11. A coating composition comprising a solution of rubber in a rubber solvent, a drying oil and an amount of cobalt drier equivalent to from about 0.001% to 0.01% cobalt metal on the basis of weight of oil employed.

12. The process of making a coating composition which comprises mixing unvulcanized rubber, a drying oil, and a metal drier, in the proportions of more than 40 gallons of oil for each 100 pounds of rubber, the amount of drier used being equivalent to between 0.001 and 0.01% of cobalt based on the weight of oil, said rubber and oil being mixed at a temperature below 200° F.

13. The process which comprises dispersing unvulcanized rubber in a drying oil, mixing therewith an amount of a metal drier equivalent to between 0.001 and 0.01% of cobalt based on the weight of oil present, and heating the resulting composition in the form of a thin film to a temperature between about 65° and 175° C., to oxidize the oil and cure the rubber.

14. The process which comprises heating, in the form of a thin film, a mixture containing a pigment, a thinner, a drying oil and unvulcanized rubber in the proportions of from 40 to 100 gallons of oil to each 100 pounds of rubber, and a metal drier equivalent to between 0.001 and 0.01% of cobalt based on the weight of oil present, to a temperature between about 65° and 175° C., to volatilize the thinner, oxidize the oil, and cure the rubber.

15. The process which comprises subjecting, in the form of a film, a mixture containing unvulcanized rubber, a drying oil in the proportion of from 40 to 100 gallons of oil to each 100 pounds of rubber, and from 0.001% to 10% of a metal drier, based on the combined weight of rubber and oil present, to a temperature of from about ordinary room temperature to about 175° C. in the presence of air until the oil has become oxidized and the rubber cured to the desired degree.

16. A coating composition comprising a mixture of unvulcanized rubber, a drying oil, a metal drier and a thinner, there being more than 0.4 gallon of oil for each pound of rubber in the mixture.

17. A coating composition comprising incompletely vulcanized rubber, a drying oil, a metal drier, a thinner, and a special curing agent for the rubber, from 0.4 to 10 gallons of oil being used for each pound of rubber, and the amount of drier being equivalent to between 0.001% and 0.01% of cobalt based on the weight of oil present.

18. A coating composition in the form of a hard, durable film comprising cured rubber dispersed throughout a drying oil containing from about 0.001% and 0.01% of its weight of cobalt.

In testimony whereof we affix our signatures.

CHARLES M. A. STINE.
COLE COOLIDGE.